United States Patent
Triller et al.

(10) Patent No.: US 7,824,295 B2
(45) Date of Patent: Nov. 2, 2010

(54) POWER-BRANCHED, CONTINUOUSLY VARIABLE VEHICLE TRANSMISSION

(75) Inventors: Andreas Triller, Bühl (DE); Emmanuel Simon, Herrlisheim (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 305 days.

(21) Appl. No.: 12/215,037

(22) Filed: Jun. 23, 2008

(65) Prior Publication Data

US 2009/0017960 A1    Jan. 15, 2009

Related U.S. Application Data

(60) Provisional application No. 60/936,540, filed on Jun. 21, 2007, provisional application No. 60/936,541, filed on Jun. 21, 2007, provisional application No. 60/995,776, filed on Sep. 28, 2007.

(51) Int. Cl.
 *F16H 37/02*    (2006.01)
(52) U.S. Cl. ...................................... 475/210
(58) Field of Classification Search ........................ None
See application file for complete search history.

(56) References Cited

U.S. PATENT DOCUMENTS

| | | | | |
|---|---|---|---|---|
| 3,106,855 A | * | 10/1963 | Tietze | 475/210 |
| 6,056,661 A | * | 5/2000 | Schmidt | 475/210 |
| 2005/0255956 A1 | | 11/2005 | Lauinger et al. | 475/210 |
| 2010/0056319 A1 | * | 3/2010 | Glockler | 475/211 |

FOREIGN PATENT DOCUMENTS

DE    10 2006 013 180 A1    10/2006
WO    WO 2004/038257 A1    5/2004

* cited by examiner

*Primary Examiner*—Dirk Wright
(74) *Attorney, Agent, or Firm*—Alfred J. Mangels

(57) ABSTRACT

A power-branched, continuously variable vehicle transmission includes a CVT variable speed drive that is connected to an input shaft through a planetary gear train and to an output shaft through a multistage gearbox. In an alternative embodiment, one variable speed drive shaft of the variable speed drive is connected to an input shaft, and the variable speed drive shafts are connected to an output shaft through a planetary gear train module. The power-branched transmission is compactly constructed, but permits a high start-up torque and enables a wide transmission ratio spread.

10 Claims, 8 Drawing Sheets

| | K1 | K2 | K3 | KR |
|---|---|---|---|---|
| R | - | - | - | X |
| N | - | - | - | - |
| D-Low | X | - | - | - |
| D-High-1 | X | X | - | - |
| D-High-2 | - | - | X | - |

POWER-BRANCHED, CONTINUOUSLY VARIABLE VEHICLE TRANSMISSION

BACKGROUND OF THE INVENTION

1. Field of the Invention

The present invention relates to a power-branched, continuously variable vehicle transmission having a planetary gear train that is connected to an input shaft. The planetary gear train is connected to an output shaft through a CVT variable speed drive provided with two variable speed drive shafts.

2. Description of the Related Art

Power-branched, continuously variable vehicle transmissions can be employed as automobile or truck transmissions and are generally known, for example from published German Patent Application No. DE 10 2006 013180 A1 and from International Patent Publication No. WO 2004/038257.

An object of the present invention is to provide a power-branched, continuously variable vehicle transmission of compact construction that permits high input torque and enables a wide transmission ratio spread.

SUMMARY OF THE INVENTION

A first solution to the object of the present invention is achieved with a power-branched, continuously variable vehicle transmission having a planetary gear train connected to an input shaft. The planetary gear train is connected to an output shaft through a CVT variable speed drive and a multistage gearbox that is connected downstream from the variable speed drive by means of clutches. The multistage gearbox has a first transmission shaft that is connected to a first variable speed drive shaft so that it transmits torque. The first transmission shaft has gears that mesh with gears situated on the output shaft, one of which gears can be non-rotatably coupled through a forward clutch to the second variable speed drive shaft to select a forward gear range and can be non-rotatably coupled through a reverse clutch to the output shaft.

A further solution to the object of the present invention is achieved with a power-branched, continuously variable vehicle transmission having an input shaft, an output shaft, a CVT variable speed drive, a planetary gear train module, at least one clutch and at least two brakes. The input shaft is non-rotatably connected to a variable speed drive shaft which is non-rotatably connected through the clutch to the planetary gear train module, which planetary gear train module is non-rotatably connected to another variable speed drive shaft and the output shaft. A sun gear of the planetary gear train module can be braked to a stop with a first brake, and a ring gear of the planetary gear train module can be braked to a stop with a second brake.

The vehicle transmission in accordance with the present invention is similar in compactness of construction to transmissions with only two shafts, parallel to each other, that are laterally spaced from each other.

The vehicle transmissions in accordance with the invention are characterized by a CVT variable speed drive that is coupled with a planetary gear train and, in order to realize power branching, with gear stages. Integrating a torque converter enables the transmission ratio spread to be widened, with the torque converter being installed in such a way that the increased torque resulting from the conversion does not pass through the variable speed drive, but takes place directly on the output shaft. Because of the inclusion of the CVT variable speed drive, the transmission structures in accordance with the invention have a smaller number of shift ranges than conventional manual or automatic transmissions, and consequently offer a high degree of driving comfort.

In accordance with a first aspect, a power-branched, continuously variable vehicle transmission has a planetary gear train that is connected to an input shaft. The planetary gear train is connected to an output shaft through a CVT variable speed drive and a gear-shifting gearbox that is situated downstream from the variable speed drive and is shifted by means of clutches. The multistage gearbox has a first transmission shaft that is connected to a first variable speed drive shaft so that it transmits torque, with gears that mesh with gears situated on the output shaft, one of which can be coupled non-rotatably through a forward clutch to the second variable speed drive shaft to select a forward gear range, and is non-rotatably coupled through a reverse clutch to the output shaft.

In an advantageous embodiment, the first transmission shaft carries three gears and the output shaft three gears. Three forward clutches are provided, with each of which one of the gears situated on the output shaft can be coupled non-rotatably.

There can be a free wheeling mechanism situated between the first variable speed drive shaft and the first transmission shaft.

In one embodiment of the vehicle transmission in accordance with the present invention the sun gear of the planetary gear train is non-rotatably connected with the first variable speed drive shaft, the ring gear of the planetary gear train is non-rotatably coupled with the second variable speed drive shaft, and the input shaft is non-rotatably coupled with the planet carrier.

Between the sun gear and the first variable speed drive shaft there can be a torque converter, with which the output torque of the transmission is increased without the variable speed drive having to transmit greater torque.

Alternatively, the torque converter can be situated between the first variable speed drive shaft and the free wheeling mechanism.

In accordance with another aspect of the present invention, a power-branched, continuously variable vehicle transmission has an input shaft, an output shaft, a CVT variable speed drive, a planetary gear train module, and at least one clutch and at least two brakes. The input shaft is non-rotatably connected with a variable speed drive shaft that can be non-rotatably connected through the clutch to the planetary gear train module, which is non-rotatably coupled with the other variable speed drive shaft and the output shaft. A sun gear of the planetary gear train module can be braked to a stop with a first brake, and a ring gear of the planetary gear train module can be braked to a stop with a second brake.

By preference, the planetary gear train module includes two planetary gear trains, with the first variable speed drive shaft being non-rotatably connected with the ring gear of the first planetary gear train, whose planet carrier is non-rotatably connected with the ring gear of the second planetary gear train, which can be braked to a stop by means of the second brake. The sun gears of both planetary gear trains are non-rotatably connected with each other, the planet carrier of the second planetary gear train is non-rotatably connected with the output shaft, and a shaft that is non-rotatably connected with the one variable speed drive shaft through the clutch is rotationally meshed with the planet carrier of the first planetary gear train.

The second variable speed drive shaft can be connected with the planetary gear train module through a torque converter.

For a compact design of the vehicle transmission in accordance with the present invention, it is beneficial if the transmission has a total of two parallel axes, situated at a distance from each other, around one or the other of which all of the shafts in the transmission rotate.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
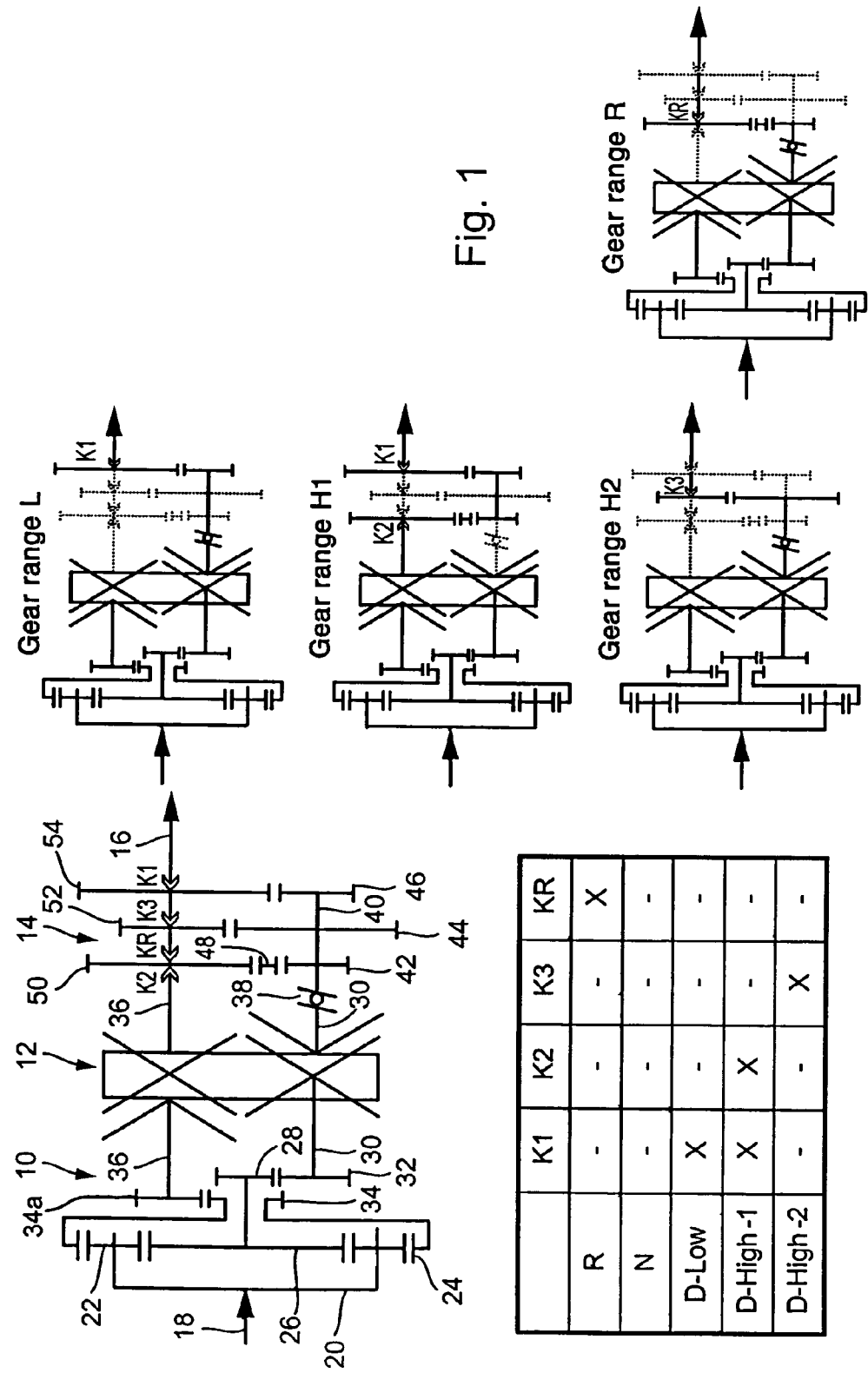
FIG. 1 is a schematic diagram of a first embodiment of a vehicle transmission in accordance with the present invention, showing the overall arrangement of the transmission and the operating states of clutches and the flow of torque in various driving ranges.

In accordance with the schematic diagram shown in the upper left part of FIG. 1, a power-branched, continuously variable vehicle transmission has a planetary gear train 10 on the input side. The planetary gear train is connected to an output shaft 16 through a CVT variable speed drive 12 (a transmission stage having a continuously variable transmission ratio), and downstream from the latter a multistage gearbox 14 with an output shaft 16.

More precisely, an input shaft 18 driven by an internal combustion engine, for example, is non-rotatably connected with the planet carrier 20 of planetary gear train 10. Planet gears 22 mesh with ring gear 24 and sun gear 26. Non-rotatably connected with sun gear 26 through the latter's shaft is an intermediate gear 28, which meshes with a gear 32 that is non-rotatably connected to a first variable speed drive shaft 30 of variable speed drive 12. Ring gear 24 is non-rotatably connected to a gear 34 with external teeth and which is rotationally meshed with a gear 34a non-rotatably carried by second variable speed drive shaft 36 of variable speed drive 12.

CVT variable speed drive 12 can be of any known design in which the transmission ratio between two variable speed drive shafts can be varied continuously. For example, CVT variable speed drive 12 can be designed as a belt-driven conical-pulley variable speed drive, in which an endless torque-transmitting means circulates between two conical disk pairs that rotate about respective axes that are parallel and are laterally spaced from each other. The spacing between the conical disks of the disk pairs can be changed in opposite directions to change the transmission ratio.

The first output shaft 30 of the CVT variable speed drive 12 is connected through a free wheeling mechanism 38 to a first shaft 40 of the multistage gearbox 14. First shaft 40 carries three gears 42, 44, and 46 of different diameters, which are axially spaced from each other and are non-rotatably connected to the shaft. Gear 42 meshes with a gear 50 through an intermediate gear 48. Gears 44 and 46 each mesh directly with gears 52 and 54, respectively. Gears 50, 52, and 54 are supported on output shaft 16, and can be non-rotatably coupled with output shaft 16 by means of respective clutches KR, K3, and K1, which are preferably jaw clutches. Gear 50 can be coupled with second variable speed drive shaft 36 in a rotationally fixed connection through another clutch K2.

The chart shown in the lower left in FIG. 1 indicates the operational positions of clutches K1, K2, K3, and KR, depending upon various selectable gear ranges in the illustrated transmission. R means reverse gear; N means the neutral setting of the transmission; D-Low means a slow gear range with high transmission ratio; D-High-1 means a different gear range with lower transmission ratio, and D-High-2 means a third forward gear range with a lower transmission ratio than D-High-1, i.e., a transmission ratio for driving fast. An x within a box within a box means that the corresponding clutch is engaged in each case. A dash means that the corresponding clutch is disengaged.

The torque flows for the various gear ranges are indicated in four diagrams in the right half of FIG. 1. For the sake of clarity the reference numerals associated with the several components of the transmission are not shown in the diagrams that show the individual gear ranges. As can be seen, in the L range (D-Low), with clutch K1 engaged, there is a flow of torque from input shaft 18 through planetary gear train 10 and variable speed drive 12 to the first variable speed drive shaft 30 of the latter, and from there through the free wheeling mechanism 38, which transmits torque from the first variable speed drive shaft 30 to the first shaft 40 of the multistage gearbox 14, to gear 46, which meshes with gear 54, which is non-rotatably connected with output shaft 16 through the engaged clutch K1.

In the H1 range (D-High-1) clutches K3 and KR are disengaged and clutches K1 and K2 are engaged, so that the flow of torque is from the second variable speed drive shaft 36 through engaged clutch K2 to gear 50, and from there via intermediate gear 48 to gear 42, and further via the first shaft 40 of the multistage gearbox 14 to gear 46, and from there to output shaft 16, as in the L range.

In the H2 gear range (D-High-2) only clutch K3 is engaged, so that the transmission of torque takes place from the first variable speed drive shaft 30 through the free wheeling mechanism 38 to gear 44, and on to gear 52, and from there through the engaged clutch K3 to output shaft 16.

In reverse gear only clutch KR is engaged, so that with the direction of rotation reversed, torque is transmitted from the first variable speed drive shaft 30 through free wheeling mechanism 38 and gears 42, 48, and 50 to output shaft 16.

In neutral all the clutches are disengaged.

As can be seen from the foregoing, the torque operating from input shaft 18 is divided between two variable speed drive shafts 30, 36, so that the endless torque-transmitting means of the variable speed drive 12 does not have to transmit the entire torque.

Figure 2:
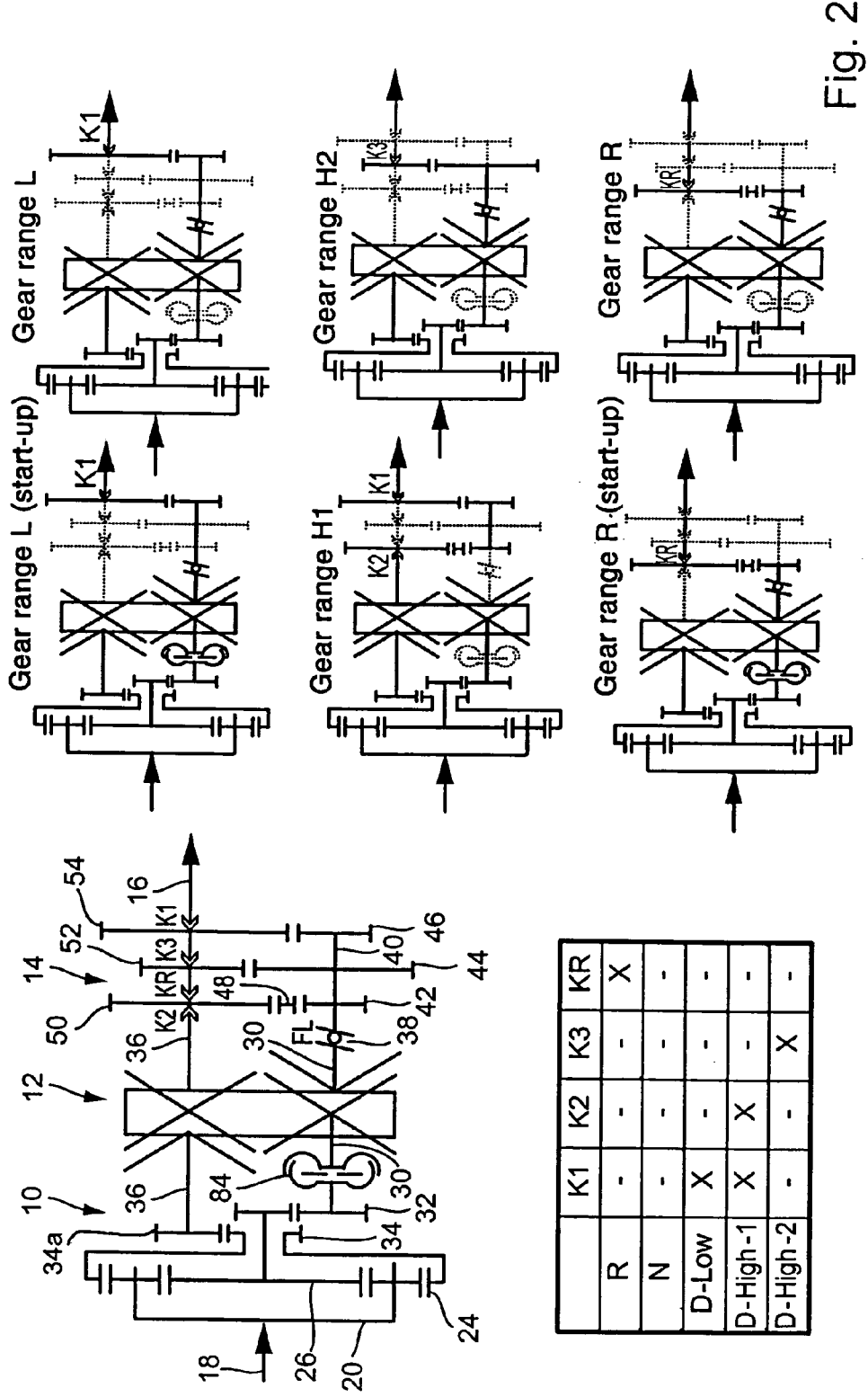
FIGS. 2 through 4 are schematic diagrams similar to FIG. 1 of various alternative embodiments of a vehicle transmission in accordance with the present invention.

FIG. 2 shows another embodiment of the transmission, which differs from the version shown in FIG. 1 in that a torque converter 84 is situated between the gear 32, which is rotatably connected with sun gear 26 through intermediate gear 28, and the first variable speed drive shaft 30. With the torque converter the transmission ratio spread of the transmission or its output torque can be increased further, without placing any additional load on the variable speed drive.

Figure 3:
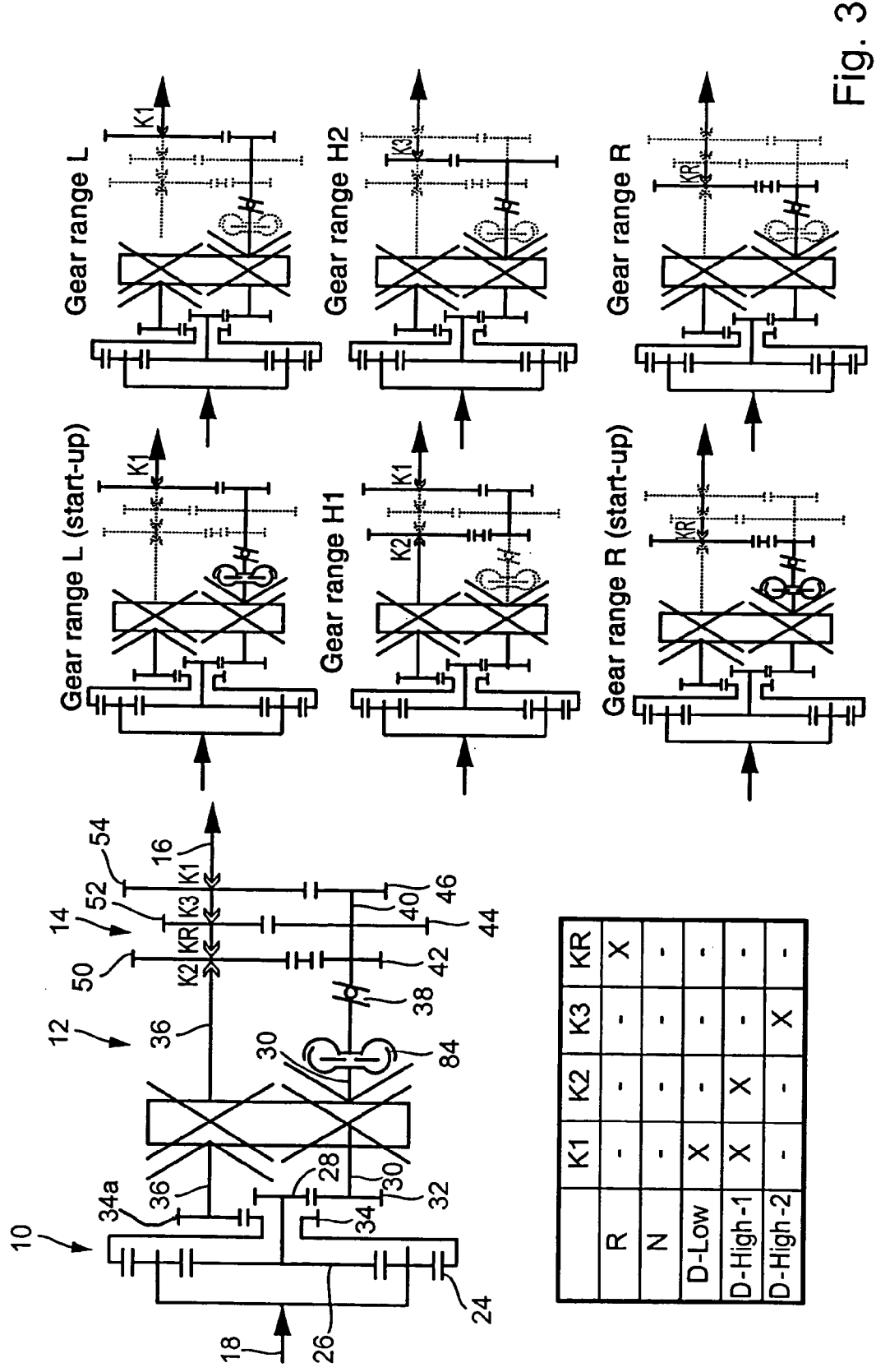

FIG. 3 shows a modified embodiment of the transmission in accordance with the invention, compared to FIG. 2, in which the torque converter 84 is situated on the output side of the first variable speed drive shaft, before the free wheeling mechanism 38. In this embodiment also, the transmission ratio spread and the output torque of the transmission can be increased without placing additional demands on the variable speed drive. The location of the torque converter 84 depends upon the available construction space.

As can be seen directly from FIGS. 1 through 3, positioning the variable speed drive shaft 36 on the same axis as the output shaft 16, which is also a shaft of the multistage gearbox 14, as well as positioning on one axis first variable speed drive shaft 30 and the first shaft 40 of the multistage gearbox 14, as well as placing the shafts of the planetary gear train 10 appropriately, achieves a very compact design of the transmission in accordance with the present invention.

Figure 4:
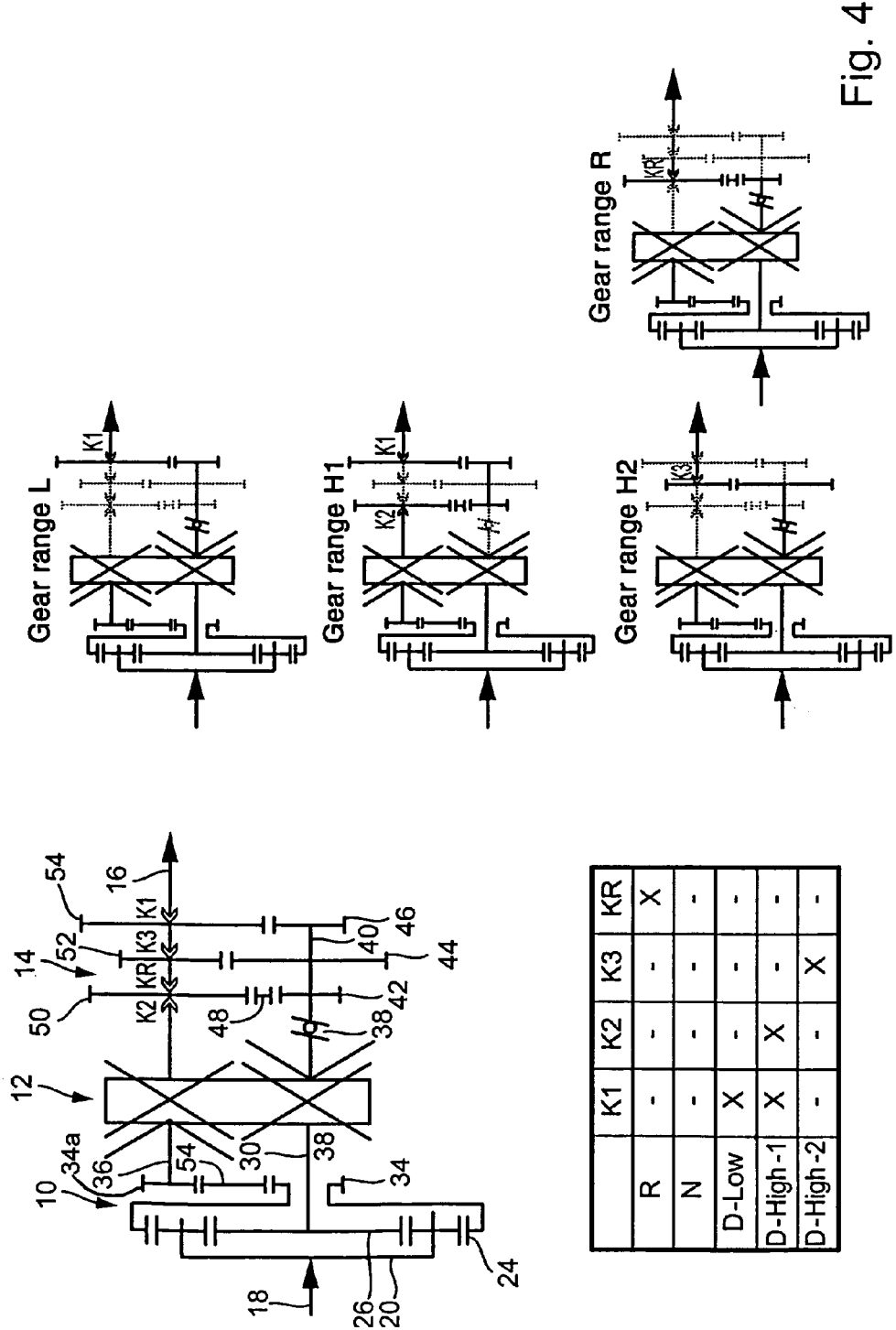

FIG. 4 shows an embodiment of the transmission that is slightly modified with regard to the planetary gear train 10 from the embodiments illustrated in FIGS. 1 through 3. In the embodiment in accordance with FIG. 4, the sun gear 26 of the planetary gear train 10 is coaxial with the first variable speed drive shaft 30 and is non-rotatably connected to the latter. The externally-toothed gear 34, which is non-rotatably connected to ring gear 24, is rotatably coupled through an intermediate gear 54 to a gear 34a that is situated on the same axis with the second variable speed drive shaft 36. Otherwise the functioning of the transmission in accordance with FIG. 4 corresponds to that of the transmission in FIG. 1.

The illustrated embodiments can be modified in many ways. For example, clutches K1 and K3 can be situated on the gearbox first shaft 40 and can couple the gears 44 and 46 non-rotatably with the first shaft. Gears 52 and 54 are then continuously non-rotatably connected with output shaft 16. Additional gears can be provided for selecting other gear ranges, or gears can be eliminated, so that only the L range and the R range can be selected, for example. In that case the free wheeling mechanism 38 can be dispensed with.

Figure 5:
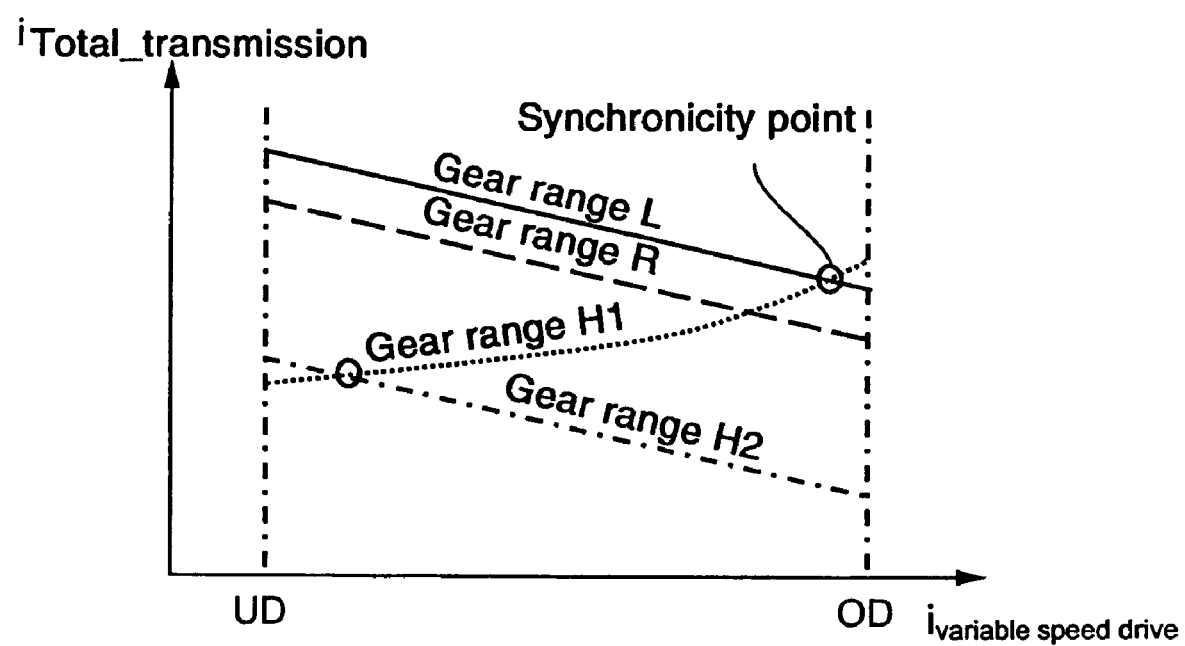
FIG. 5 is a graph showing the transmission ratios of the transmissions shown in FIGS. 1 through 4.

FIG. 5 shows the transmission ratio i of the total transmission ($i_{total\_transmission}$) as a function of the transmission ratio of the variable speed drive ($i_{variable\ speed\ drive}$), which is changeable between UD (underdrive) and OD (overdrive). As will be understood, when driving off, the L range (D-Low) is selected by engaging the clutch K1. The transmission ratio of the variable speed drive then changes from UD to OD. Shortly before reaching the OD transmission ratio, a point of synchronicity is reached, at which, while continuing to keep clutch K1 engaged, engaging clutch K2 shifts over to the H1 range (D-High-1). The variable speed drive transmission ratio then changes from OD to UD, and shortly before reaching the UD transmission ratio another synchronicity point is reached, at which clutches K1 and K2 can be disengaged and clutch K3 can be engaged, so that the range H2 (D-High-2) is selected, in which an increasingly longer transmission ratio can be achieved by changing the transmission ratio of the variable speed drive from UD to OD.

With clutches K1, K2 and K3 disengaged and clutch KR engaged, reverse gear is selected, in which the spread of the variable speed drive can be traversed once.

As can be seen from FIG. 5, the spread of the variable speed drive can be traversed three times when traveling forward to increase the total transmission ratio spread of the transmission.

Another embodiment of a vehicle transmission in accordance with the present invention will now be described on the basis of FIG. 6. In that embodiment a planetary gear train module 72 is situated after the CVT variable speed drive 12 in the direction of torque flow. Where the same reference numerals are used for the embodiment in accordance with FIG. 6 as for the embodiments in accordance with FIGS. 1 through 4, those reference numerals refer to components with the same function as those shown in FIGS. 1 through 4.

Figure 6:
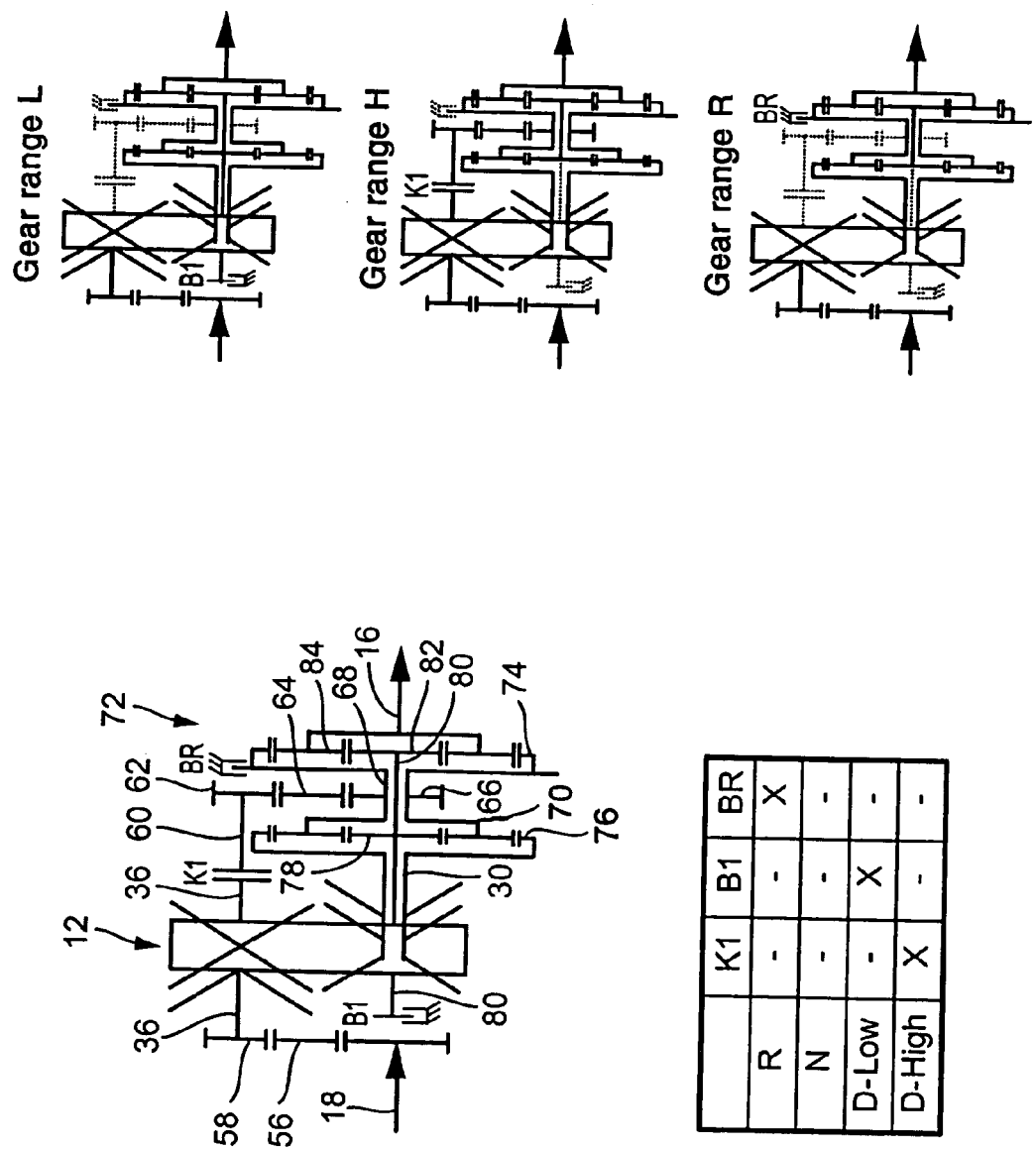
FIG. 6 is a schematic diagram similar to FIG. 1 of another embodiment of a vehicle transmission in accordance with the present invention.

In the embodiment in accordance with FIG. 6, input shaft 18 is rotatably connected through an intermediate gear 56 with a gear 58, which is coaxial with the second variable speed drive shaft 36 and is non-rotatably connected with the latter. The second variable speed drive shaft 36 is connected through a clutch K1 to another coaxial shaft 60, which is non-rotatably connected to a gear 62 that is rotatably coupled through an intermediate gear 64 with a gear 66 that is non-rotatably carried on a hollow shaft 68 that includes radial flanges. Shaft 68 non-rotatably connects the planet carrier 70 of a first planetary gear train of the planetary gear train module 72 with the ring gear 74 of a second planetary gear train of the planetary gear train module 72. Ring gear 76 of the first planetary gear train is non-rotatably connected to the hollow first variable speed drive shaft 30 of variable speed drive 12. Sun gear 78 of the first planetary gear train is non-rotatably connected to the sun gear 82 of the second planetary gear train through a shaft 80 that extends through the hollow first variable speed drive shaft 30 and the hollow shaft 68. Planet carrier 84 of the second planetary gear train is non-rotatably connected to the output shaft 16.

The shaft 80 can be braked to a stop by means of a brake B1. Ring gear 74, and together with it planet carrier 70 of the first planetary gear train, can be braked to a stop with a brake BR.

As can be seen, the transmission in accordance with FIG. 6 has two axes of rotation spaced from each other, which include the coaxial axes of rotation of all of the respective shafts, so that it is constructed very compactly.

The chart at the lower left of FIG. 6 shows gear ranges together with the positions of clutch K1 and of brakes B1 and BR. The transmission in accordance with FIG. 6 has two forward gear ranges and one reverse gear range, as well as the neutral range. In neutral the clutch K1 is disengaged and the brakes B1 and BR are released. In the reverse gear range the brake BR is engaged. In the first forward gear range D-Low (L gear) the brake B1 is engaged. In the second forward gear range D-High (H gear) the clutch K1 is engaged. The three diagrams in the right side of FIG. 6 indicate the flow of torque in the various gear ranges.

Figure 7:
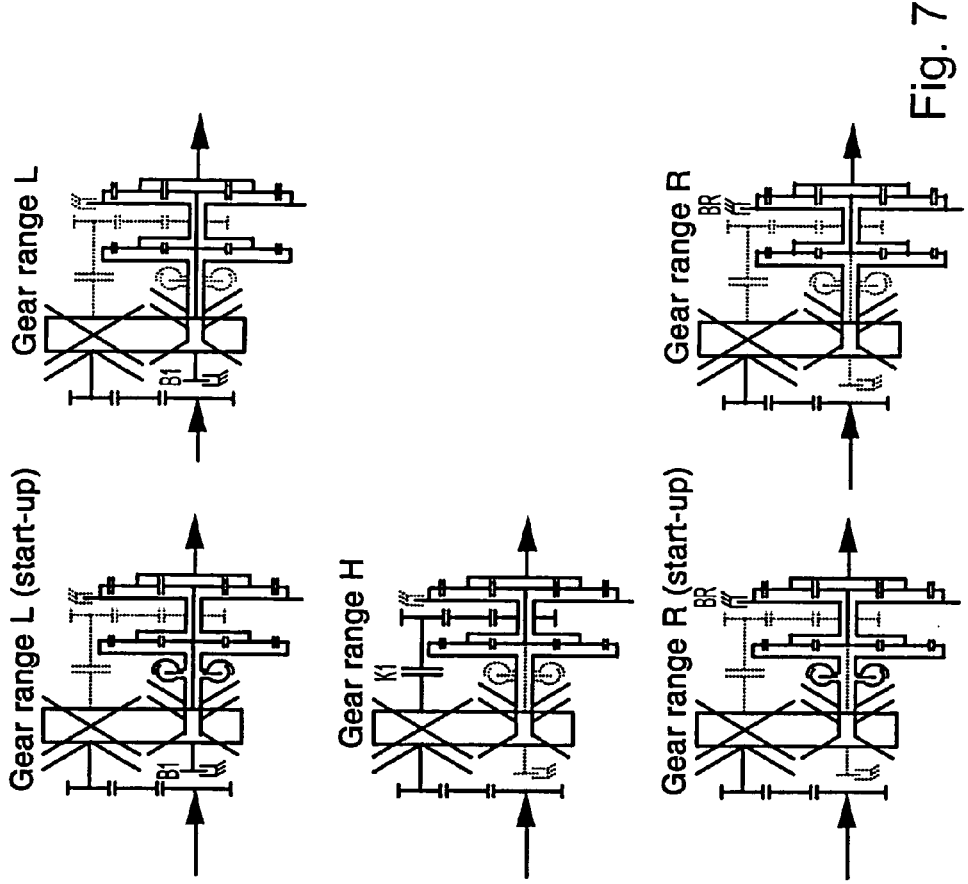
FIG. 7 is a schematic diagram of a modified embodiment of the transmission shown in FIG. 6.
Figure 7:
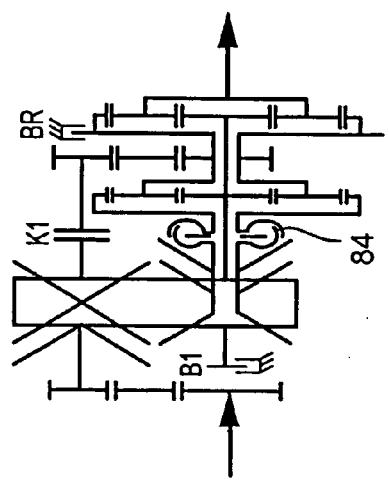

FIG. 7 shows a modification of the transmission shown in FIG. 6. In The FIG. 7 embodiment the first variable speed drive shaft 30 is separated by a torque converter 84, advantageously a hydraulic torque converter, which makes it possible to start up the output shaft 16 and increase its torque without thereby placing an additional load on the variable speed drive. For the sake of clarity, the reference numerals of FIG. 6 are not repeated in FIG. 7.

As indicated in the gear range diagrams in FIG. 7, in gear range D-Low (L gear) (start-up) it is possible to drive off with torque converter 84 in operation. After starting out, the torque converter 84 can be bridged over in a known way, so that it is inoperative and the vehicle is being driven in L gear, in which the transmission ratio is changed only by changing the transmission ratio of the variable speed drive.

Similarly, it is possible to start up in R gear with torque converter 84 in operation, which can be bridged over after starting (R gear).

Figure 8:
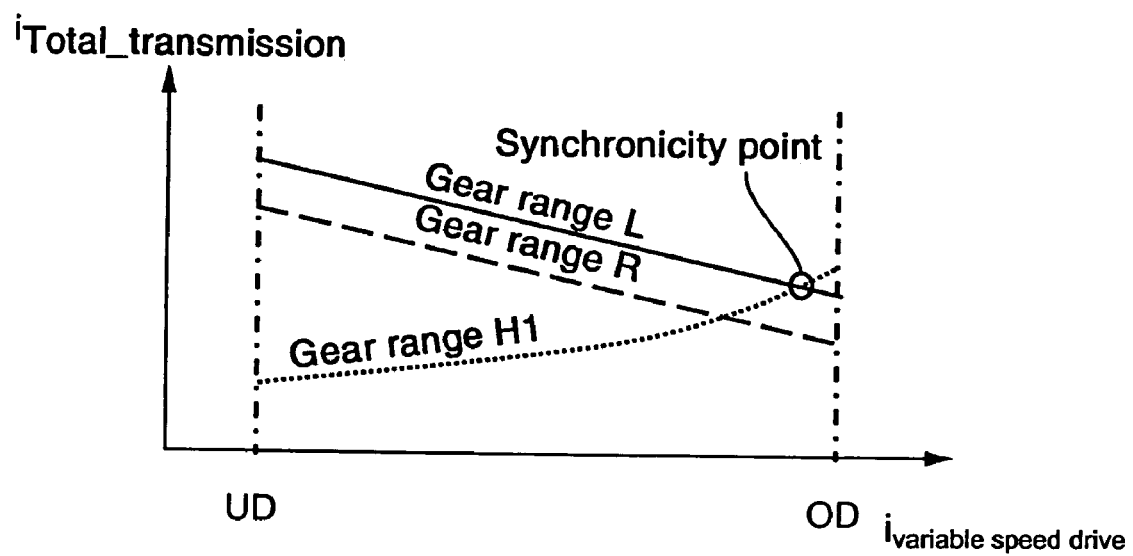
FIG. 8 a graph similar to FIG. 5 showing the transmission ratios of the transmissions in accordance with the embodiments of FIGS. 6 and 7.

FIG. 8 is a graph that is similar to that of FIG. 5, showing how the transmission ratio of the total transmission $i_{total\_transmission}$ in the transmission in accordance with FIGS. 6 and 7 can be changed by traversing the transmission ratio spread of the variable speed drive twice.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A power-branched, continuously variable vehicle transmission comprising: a transmission input shaft and a transmission output shaft; a planetary gear train operatively connected to the transmission input shaft; a variable speed drive unit operatively connected between the planetary gear train and the transmission output shaft; a multistage gearbox operatively connected between the variable speed drive unit and the transmission output shaft; wherein the gearbox includes a first gearbox drive shaft operatively connected to a first variable speed drive unit drive shaft and includes a second gearbox drive shaft operatively connected to the transmission output shaft and to a second variable speed drive unit drive shaft; wherein the first gearbox drive shaft carries a plurality of gears that mesh with associated gears carried by the second gearbox drive shaft; a forward clutch for coupling gears carried by the first and second gearbox shafts for selecting a forward gear range; and a reverse clutch for coupling respective gears carried by the first and second gearbox drive shafts for selecting a reverse gear.

2. A transmission in accordance with claim 1, wherein the first gearbox shaft non-rotatably carries three gears and the second gearbox shaft carries three gears opposite respective ones of the gears carried by the first gearbox shaft; and three forward clutches for operatively coupling respective gears carried by the first gearbox shaft and gears carried by the second gearbox shaft for operatively selecting a forward gear range.

3. A transmission in accordance with claim 1, including a free wheeling mechanism positioned between the first variable speed drive unit drive shaft and the first gearbox shaft.

4. A transmission in accordance with claim 1, wherein the planetary gear train includes a sun gear operatively coupled with the first variable speed drive unit drive shaft; a ring gear operatively coupled with the second variable speed drive unit drive shaft; and a planet carrier non-rotatably connected with the transmission input shaft.

5. A transmission in accordance with claim 4, including a torque converter operatively coupled between the sun gear and the first variable speed drive unit drive shaft.

6. A transmission in accordance with claim 3, including a torque converter operatively coupled between the first variable speed drive unit drive shaft and the free wheeling mechanism.

7. A power-branched, continuously variable vehicle transmission comprising: a transmission input shaft and a transmission output shaft; a planetary gear train module positioned between the transmission input shaft and the transmission output shaft; a variable speed drive unit operatively connected between the transmission input shaft and the planetary gear train module; wherein the variable speed drive unit includes a first variable speed drive unit drive shaft operatively coupled with the planetary gear train module through a clutch; wherein the variable speed drive unit includes a second variable speed unit drive shaft operatively coupled with the planetary gear train module; a first brake for braking to a stop rotation of a sun gear of the planetary gear train module; and a second brake for braking to a stop rotation of a ring gear of the planetary gear train module.

8. A transmission in accordance with claim 7, wherein the planetary gear train module includes operatively interconnected first and second planetary gear trains and wherein the second variable speed drive unit drive shaft is operatively connected with a ring gear of the first planetary gear train having a planet carrier non-rotatably connected with a ring gear of the second planetary gear train; wherein the ring gear of the second planetary gear train is braked to a stop by the second brake; wherein sun gears of each of the first and second planetary gear trains are non-rotatably connected with each other and a planet carrier of the second planetary gear train is non-rotatably connected with the transmission output shaft; and the first variable speed unit drive shaft is operatively coupled through the clutch with the planet carrier of the first planetary gear train.

9. A transmission in accordance with claim 8, wherein the second variable speed drive unit drive shaft is operatively coupled with the planetary gear train module through a torque converter.

10. A transmission in accordance with claim 7, wherein the transmission has two parallel axes that are spaced from each other and around one or the other of which all of the shafts in the transmission rotate.

* * * * *